United States Patent [19]

Franaszek

[11] 3,840,854

[45] Oct. 8, 1974

[54] LIMITATION OF A.C. COUPLING DISTORTION IN MAGNETIC RECORDING

[75] Inventor: Peter Anthony Franaszek, Mt. Kisco, N.Y.

[73] Assignee: International Business Machines Corporation, Armonk, N.Y.

[22] Filed: Sept. 5, 1973

[21] Appl. No.: 394,590

Related U.S. Application Data

[63] Continuation of Ser. No. 220,008, Jan. 24, 1972, abandoned.

[52] U.S. Cl. .................... 340/146.1 AB, 178/69 D, 179/100.2 K, 360/26

[51] Int. Cl. .................... G06k 5/00

[58] Field of Search .... 340/146.1 AB; 179/100.2 K; 360/26, 34, 41; 178/69 A, 69 D; 325/38 A

[56] References Cited

UNITED STATES PATENTS

| | | | |
|---|---|---|---|
| 3,586,768 | 6/1971 | Ganske | 179/100.2 K |
| 3,611,141 | 10/1971 | Waters | 340/146.1 AB |
| 3,622,894 | 11/1971 | Heidecker | 179/100.2 K |
| 3,757,297 | 9/1973 | O'Brien et al. | 340/136.1 AB |
| 3,783,383 | 1/1974 | Forster | 340/146.1 AB |

*Primary Examiner*—Charles E. Atkinson
*Attorney, Agent, or Firm*—Victor Siber

[57] ABSTRACT

This is an apparatus and method for reducing a. c. coupling distortion which is present in a transformer coupled saturated digital magnetic recording system. All data that is to be recorded is partitioned into blocks of specified lengths. Each block of data is then coded so as to be preceded by a prefix bit. The prefix bit takes on a binary value of "0" or "1" depending on the number of transition states present in the block of data, the sign of the saturation level at the beginning of the block, and a measure of the accumulated d.c. distortion referred to as the running digital sum. The block data with the associated prefix bit is processed to develop a running digital sum for all data blocks. Selection of a 0 or 1 prefix is based on a test that indicates which prefix bit results in the lowest digital sum.

7 Claims, 17 Drawing Figures

LIMITATION OF A.C. COUPLING DISTORTION IN MAGNETIC RECORDING

This is a continuation of application Ser. No. 220,008 filed Jan. 24, 1972 and now abandoned.

BACKGROUND OF THE INVENTION

This invention relates to transformer coupled magnetic recording systems. More particularly, it relates to the elimination of a. c. coupling distortion which exists in a saturated magnetic recording system.

In digital computing systems and equipment the storage of information is accomplished by utilizing the binary system or some modification thereof. Computer processors normally require a storage medium for maintaining large quantities of digital information representing data and instructions, which information is in the form of binary "bits", i. e., ones and zeros. Magnetic storage media are ideally suited for storing this type of information due to the inherent characteristic of magnetizable mediums to be in one of two stable magnetic states. Four principle types of magnetic memories are currently employed by large data processing systems. These are the high speed core memories, magnetic drum memories, magnetic disc memories, and magnetic tapes. In the latter three memory systems, the medium is conventionally moved relative to a "writing" transducer which magnetizes successive areas on the medium in either of two modes for representing the respective binary values 0 and 1. The magnetic medium which has been so recorded is then moved past a "reading" transducer which develops a signal representative of the information recorded on the medium. One principal recording system for recording on a magnetizable medium utilized in the prior art is the non-restore-to-zero system. This type of recording system utilizes saturation of the magnetic medium in a first direction to represent a zero and saturation in a second direction to represent a one. However, there is no intermediate nonmagnetized area to represent the space between bits and a change of the magnetic signal recorded on the medium only occurs at a boundary between one and zero. It may readily be seen that when strings of zeros or ones occur, a continuous signal is recorded on the recording medium.

In non-return-to-zero recording systems binary information is transduced by a recording heat to apply a pulse to the recording medium. One means for coupling the recording head to the digital circuits of the data processing equipment is by transformer coupling. Generally in the recording of a binary data stream, there are sufficient transitions, or boundaries between the zero and one state which would permit the transformer coupling to the recording head. However, it is not uncommon to record long strings of ones or zeros which are represented by a fixed saturation level at the input to the coupling transformer. Such long strings of nontransition data produce an error condition generally referred to as a. c. coupling distortion. Under this condition, the coupling distortion error causes a nonsaturation recording of a transition which upon the decoding process is erroneously interpreted as a nontransition condition. This, in effect, means that errors will be introduced in the decoding process, the error being dependent on the code utilized.

OBJECTS OF THE INVENTION

Therefore, it is an object of the present invention to limit the a. c. coupling distortion present in a magnetic recording system.

It is a further object of the present invention to limit the degredation resulting from a. c. coupling of a writing heads in a digital saturated magnetic recording system.

It is a further object of the present invention to limit the a. c. coupling distortion in a transformer coupled saturated magnetic recording system by bounding the digital sum of all information that is recorded.

SUMMARY OF THE INVENTION

In the present invention an apparatus and process for limiting a. c. coupling distortion in a non-return-to-zero recording system having a transformer coupled recording head is provided. The process consist of coding all binary data prior to introduction to the transformer coupling mechanism that is connected to the recording head. All data bits to be recorded are segmented into blocks of binary digits of specified length. Then, a prefix bit is introduced at the beginning of each data block. The prefix bit may be either a 1 or a 0 binary value which in turn effects the recording of either a transition or a steady state respectively on the recording medium.

A. c. coupling distortion is limited by a process which selects the appropriate 1 or 0 prefix value in accordance with the choice which results in a minimum digital sum for all data recorded on the recording medium. That is, the digital sum of each data block is sequentially calculated and combined with all previous digital sums so as to select that prefix value which tends to minimize the total digital sum.

The apparatus for implementing the process of a. c. coupling distortion limitation simultaneously computes the running digital sum for both a 1 and 0 prefix. Then, a comparison is made between the sums obtained under each prefix case and the minimum sum is used to control the output of the proper prefix code. After selection of the minimum digital sum path, the nonselected running digital sum processor is updated with the selected sum value.

DESCRIPTION OF THE INVENTION

Figure 1:
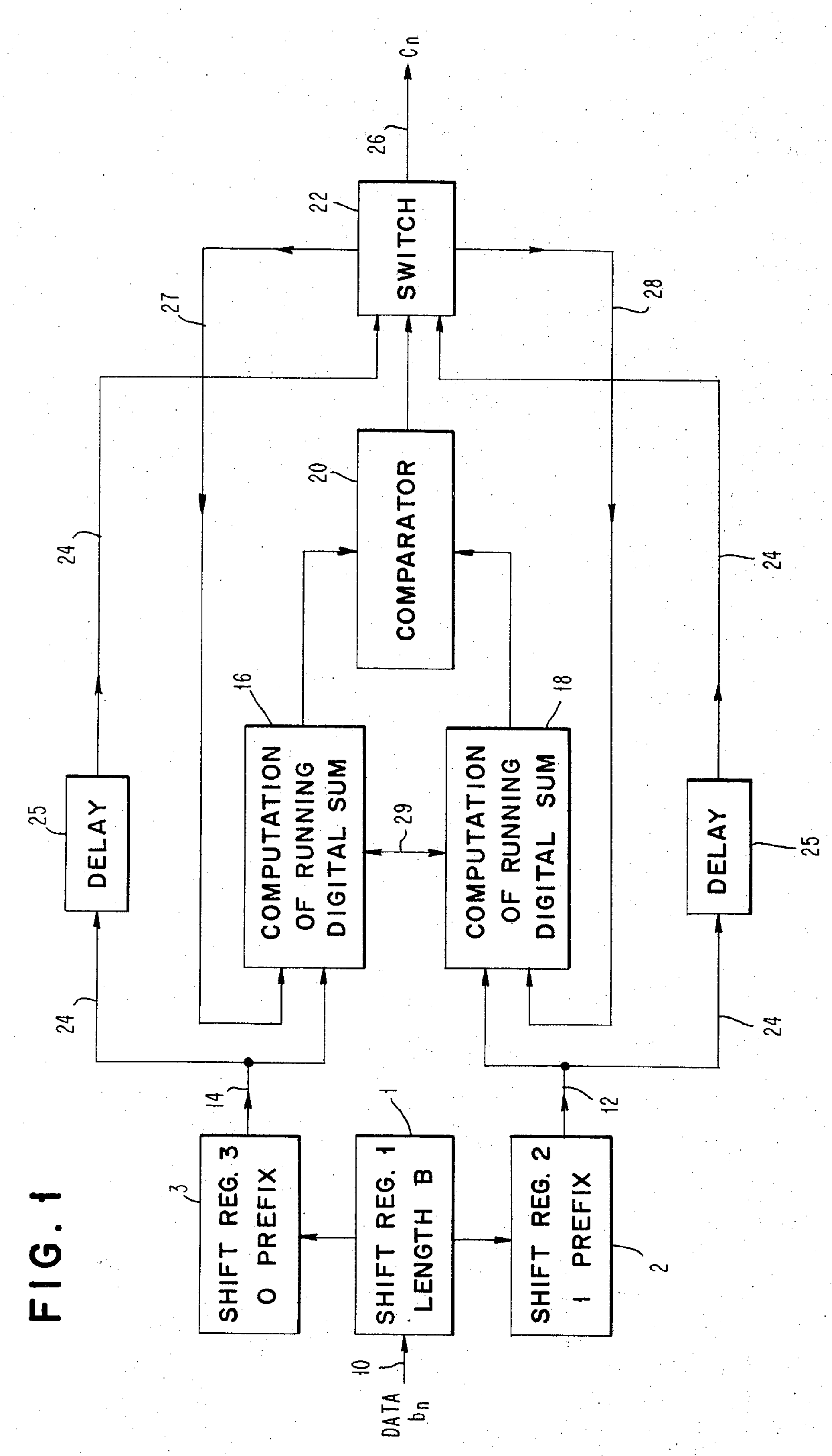
FIG. 1 is a block diagram representation of an apparatus for prefix coding binary data so as to limit a. c. coupling distortion.

In the preferred embodiment of this invention data that is to be recorded on a magnetic storage medium in accordance with a non-return-to-zero method of recording is coded so as to minimize the running digital sum of the resulting code. In a magnetic recording system where coupling to the write heads is accomplished by means of a transformer, it has been found that the a. c. coupling distortion suffered by coded signals is proportional to the digital sum of the code. This digital sum is defined by the expression $$“\delta_N \sum_{n=M}^{N} a_n”$$

an where M<N is arbitrary but fixed, and $a_n$ denotes the value of the latest transmitted binary symbol. As discussed previously, in non-return-to-zero digital saturation recording, information bits with no transition and positive saturation may be assigned a value of +1. Information bits with no transition and negative saturation may be assigned a value of −1. If a transition occurs, then the information bit has a value of 1. Referring to FIG. 1, there is shown a block diagram of the apparatus for minimizing the digital sum of data $b_n$ that is to be recorded on a magnetic medium. The data stream $b_n$ consisting of a plurality of binary ones and zeros obtained from data processing equipment is introduced into shift register 1 by means of input line 10. This shift register 1 is of a prespecified length B. It should be recognized by those skilled in the art, that the selection of the block length as represented by the size of the register is arbitrary.

The data block which is loaded into shift register 1 is simultaneously loaded into shift registers 2 and 3. Shift register 2 contains a 1 prefix bit and shift register 3 contains 0 prefix. In both of these registers 2 and 3, the prefix is a prestored binary value which is contained in the first storage position of the shift registers. Thus, shift register 2 contains a 1 binary value as its first position and shift register 3 contains a 0 binary value as its first position.

After the data block $b_1$ is contained in shift registers 2 and 3 the processing portion of the apparatus is ready to begin processing. The entire block of data including the prefix is shifted out of the registers 2 and 3 simultaneously along lines 12 and 14 respectively. The binary digits which are present along lines 12 and 14 are introduced into identical processors 16 and 18, each computing a running digital sum of all binary values shifted out of the registers. Each of these processors 16 and 18 maintain a sum of all binary values by adding or subtracting a quantity depending upon the value of the bit being output from the shift register. In this embodiment, the processors 16 and 18 are capable of adding or subtracting a value of one from a counter mechanism. All one binary values which are introduced to the processors 16 and 18 control whether the processors add or subtract. Thus, means are contained in each of the processors 16 and 18 which switch an addition/subtraction control for operating the digital sum computation. Then, all binary zeros which are output from the registers 2 and 3 and are respectively introduced into processors 16 and 18 result in either an addition or subtraction to be performed within the processors depending upon the state addition/subtraction control of each of the processors.

As is readily apparent from the block diagram in FIG. 1, there is simultaneous processing by identical means of 0 prefix and 1 prefix blocks of data. When the digital sum in processors 16 and 18 reflect the summation of all the bits which are contained in shift registers 2 and 3, a comparison is made by comparator 20 to determine which of the digital sums is smaller. That is, the resulting sum in processor 16 is compared with the resulting sum in processor 18.

As discussed previously, it is the purpose of the apparatus shown in FIG. 1 to bound the running digital sum which in turn minimizes the a. c. coupling distortion. Accordingly, the comparator 20 is utilized to make a selection of either the zero prefix code or the one prefix code by enacting one of the output paths through switch 22. For example, if the sum in processor 16 is less than in the sum of processor 18, the switch 22 will be engaged in such a manner by means of line 21 as to allow the 0 prefix code which is shifted out of line 24 to be presented as the final coded output along line 26, as data $C_n'$. Note, that delay 25 provides the amount of delay necessary to complete computations in processors 16 and 18 so that when the digital sum is computed for the data block, the code information on line 24 is then present at the input to the switch 22.

In order to maintain a history of the digital sum, the state of switch 22 is used as a feedback control to the processors 16 and 18 along lines 27 and 28 to control transfer of the lowest sum value to the processor which contains the higher sum value by means of transfer path 29. Assuming, for example, that the digital sum in processor 16 is smaller than the sum in processor 18, after switch 22 is gated to permit the zero prefix code to be presented on the output line 26, the sum contained in processor 16 is transferred to the processor 18 so that the succeeding block of information will be processed in accordance with the history of the digital sum obtained from the previous information that has been coded.

It should be recognized by those skilled in the art, that while the preferred embodiment discloses a parallel processing technique for developing a 0 prefix and a 1 prefix simultaneously, it is also possible to economize in the amount of circuitry needed by sequentially developing each of the codes, storing the values, and then selecting the most desirable code.

Figure 2:
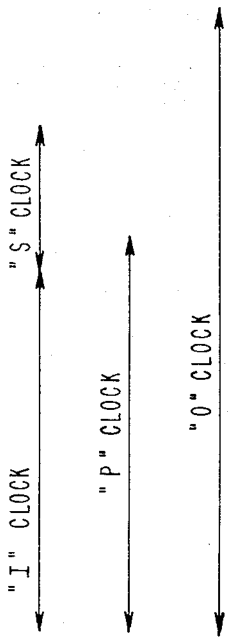
FIG. 2 is a timing diagram which shows the duration of control clocks used in the apparatus.

FIG. 2 shows a timing diagram which shows the duration of the four control clocks that are used in the preferred embodiment. The "I" clock is used for input operations. The "S" clock is used for sequencing operations. Note, that these sequencing operations are only concerned with the first four starting up cycles and the last three ending cycles. The "P" clock is used to process the data $b_n$ after it has been input. The "O" clock is used to control the output of the coded data bits to the transformer coupling of a magnetic recording head (not shown).

Figure 3:
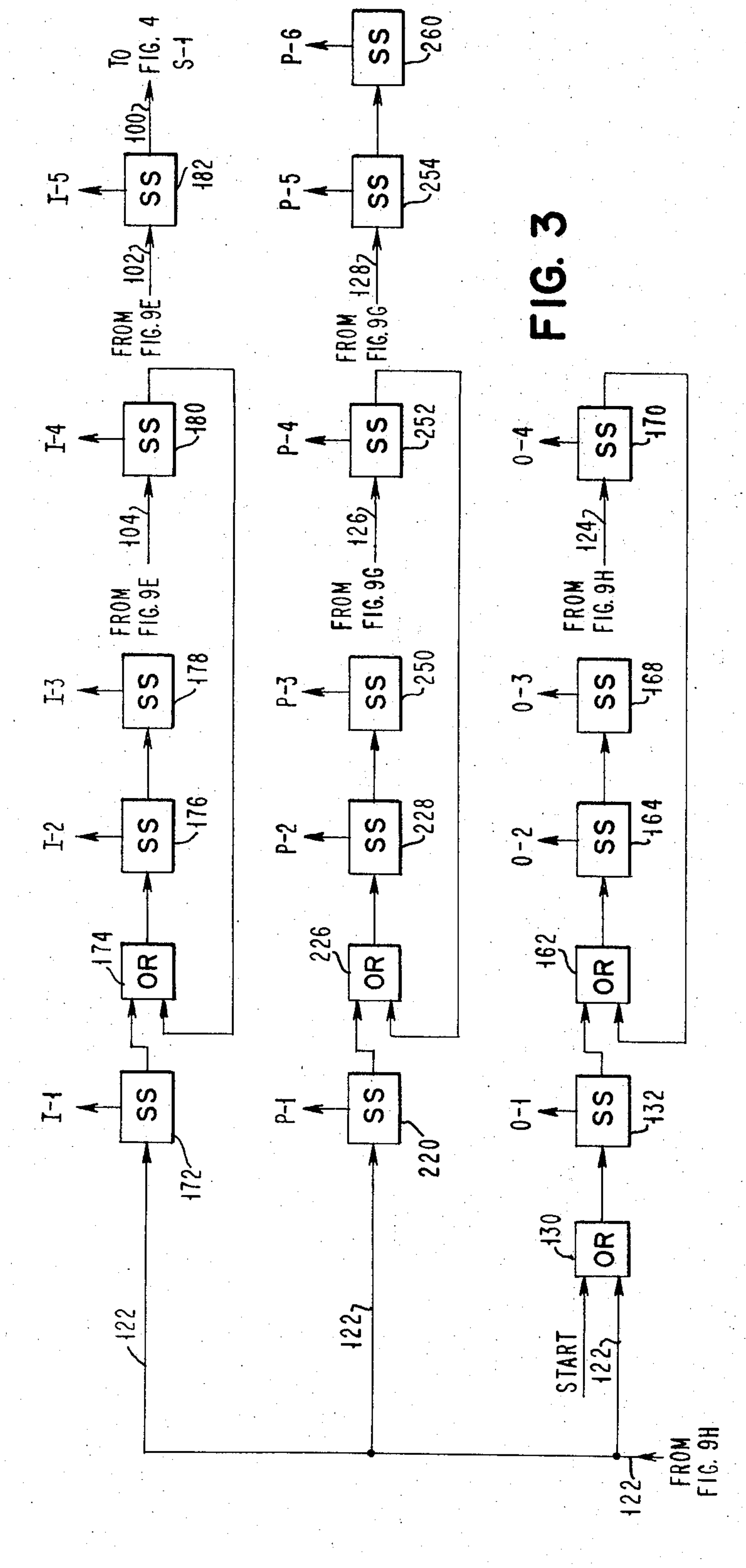
FIG. 3 illustrates the circuit configuration of the input, process, and output clock controls.

FIG. 3 shows the circuit configuration of the I, P and O clocks. The O clock is the master clock and it is always started first. As will be understood later, the ending of the O clock is a pulse on wire 122 which starts the three clocks, I, P and O, all in synchronism. When the I clock is completed, it starts the S clock.

Figure 5:
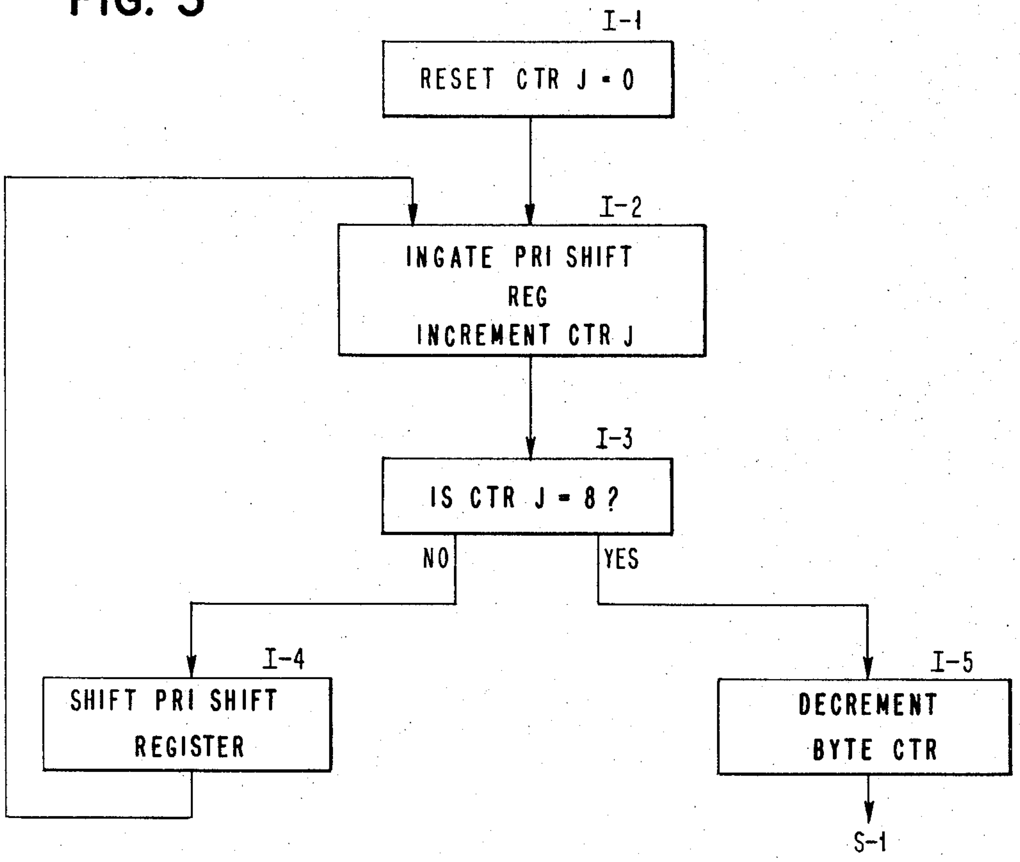
FIG. 5 is a flow diagram representation of the input operations.
Figure 6:
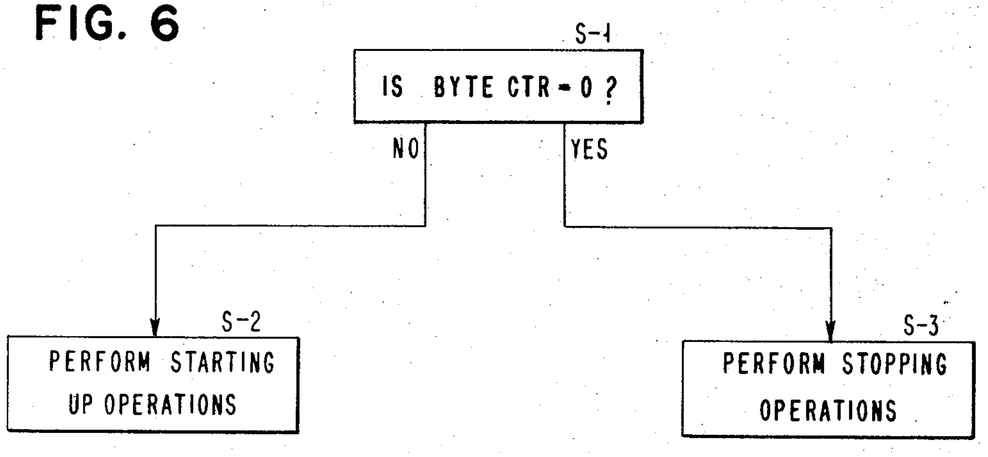
FIG. 6 is a flow diagram representation of the sequence operations.
Figure 7:
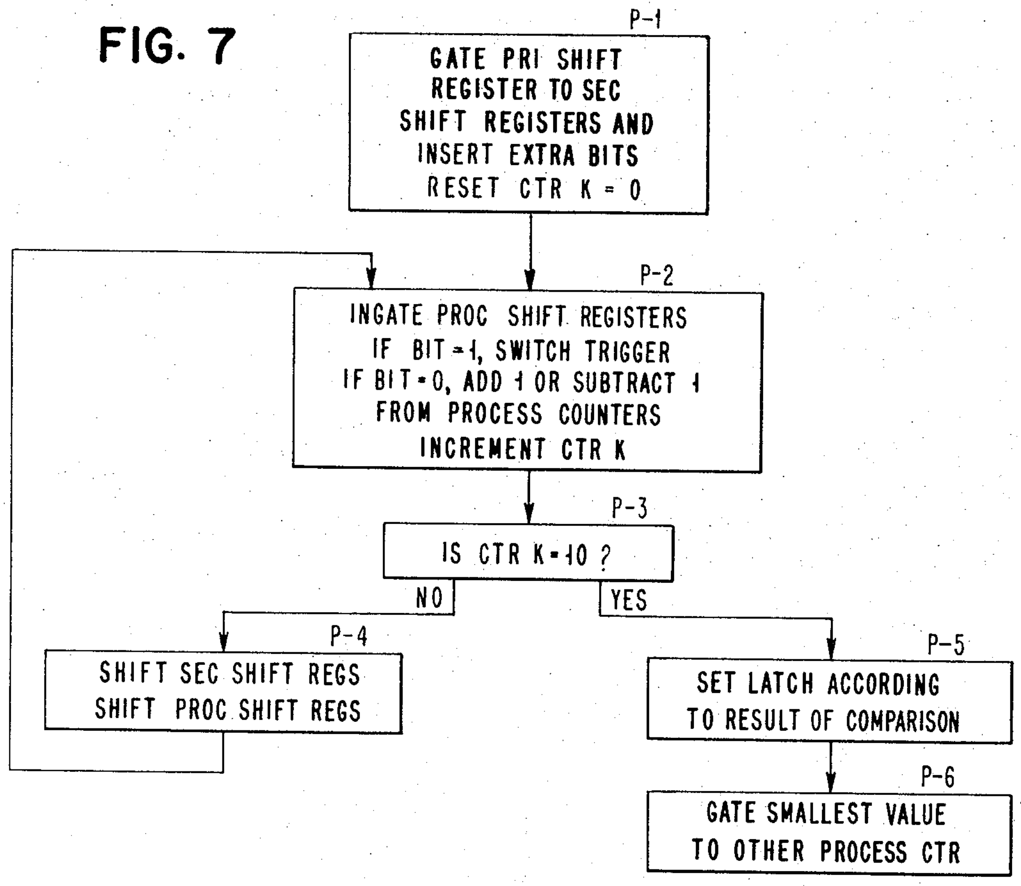
FIG. 7 is a flow diagram representation of the process operations.
Figure 8:
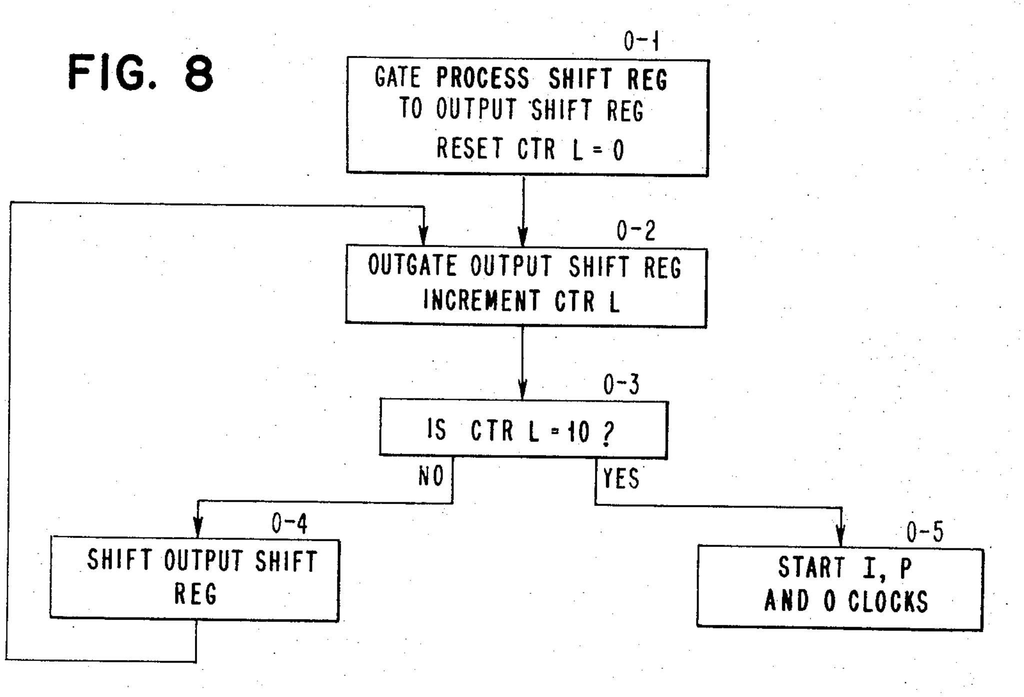
FIG. 8 is a flow diagram representation of the output process.

For the purpose of the following discussion which describes in detail the operation of the apparatus as shown in FIGS. 9A–9H, reference should be made to FIGS. 5, 6, 7 and 8 which are flow diagrams of the steps that are executed under the control of the four control clocks discussed above. FIG. 5 is a flowchart representation of the process step under the control of the I clock. FIG. 6 is a flowchart representation of the steps executed under the control of the S clock. FIG. 7 is a flowchart representation of the process control steps executed under the P clock. FIG. 8 is a flowchart representation of the process steps executed under the control of the O clock. The notation above the upper right hand corner of each process step correlates to the clock signal which is "on" during that process step.

INITIALIZATION

Figure 9A:
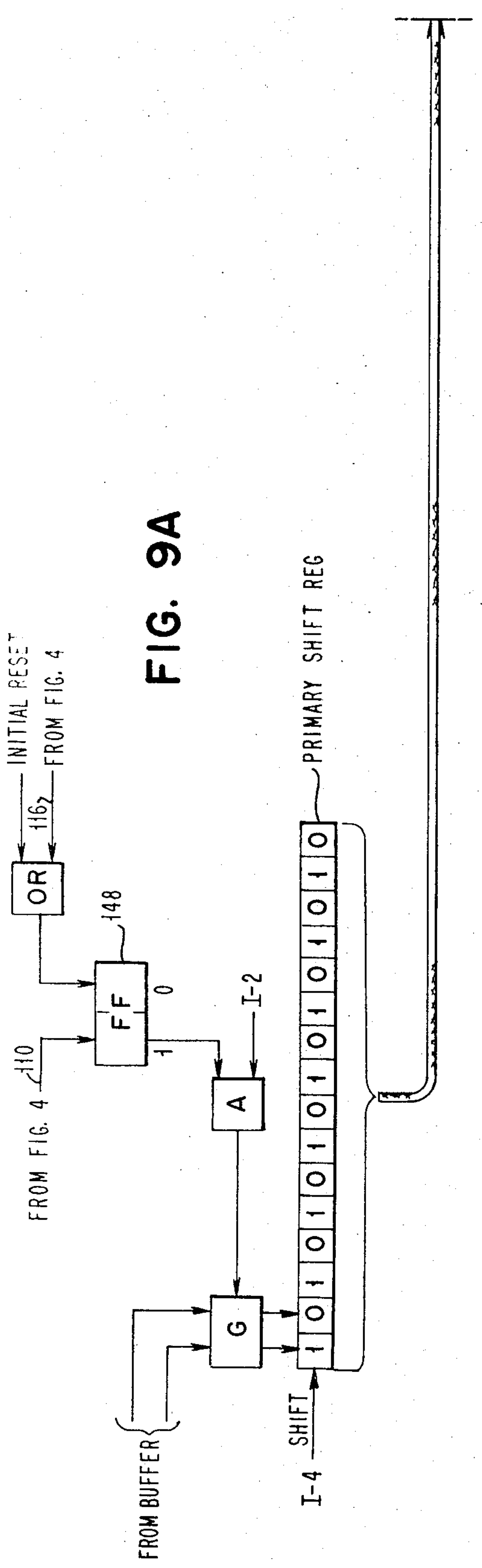
FIGS. 9 and 9A–9H are a schematic diagram of the apparatus shown in FIG. 1.
Figure 9:
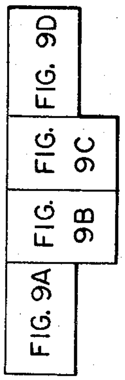
Figure 9E:
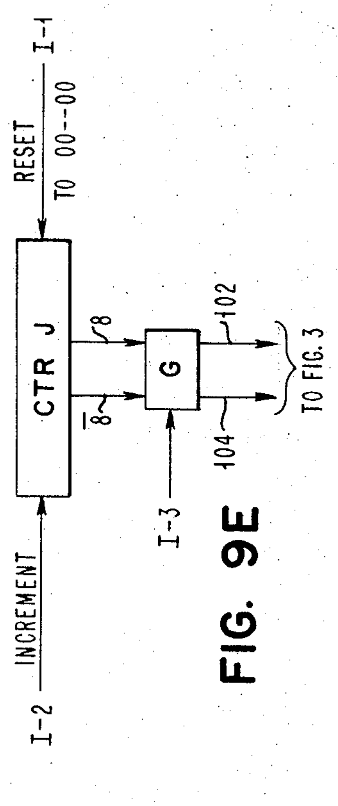
Figure 9F:
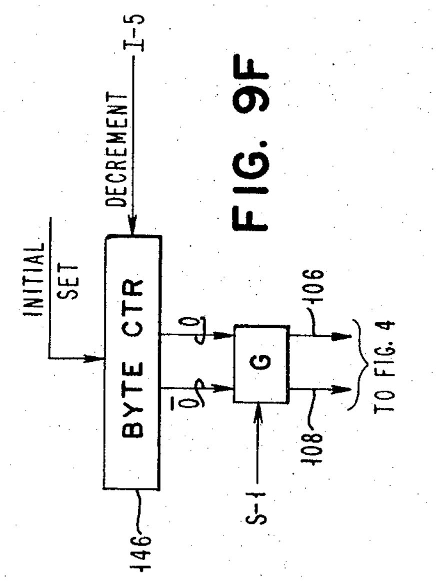
Figure 9B:
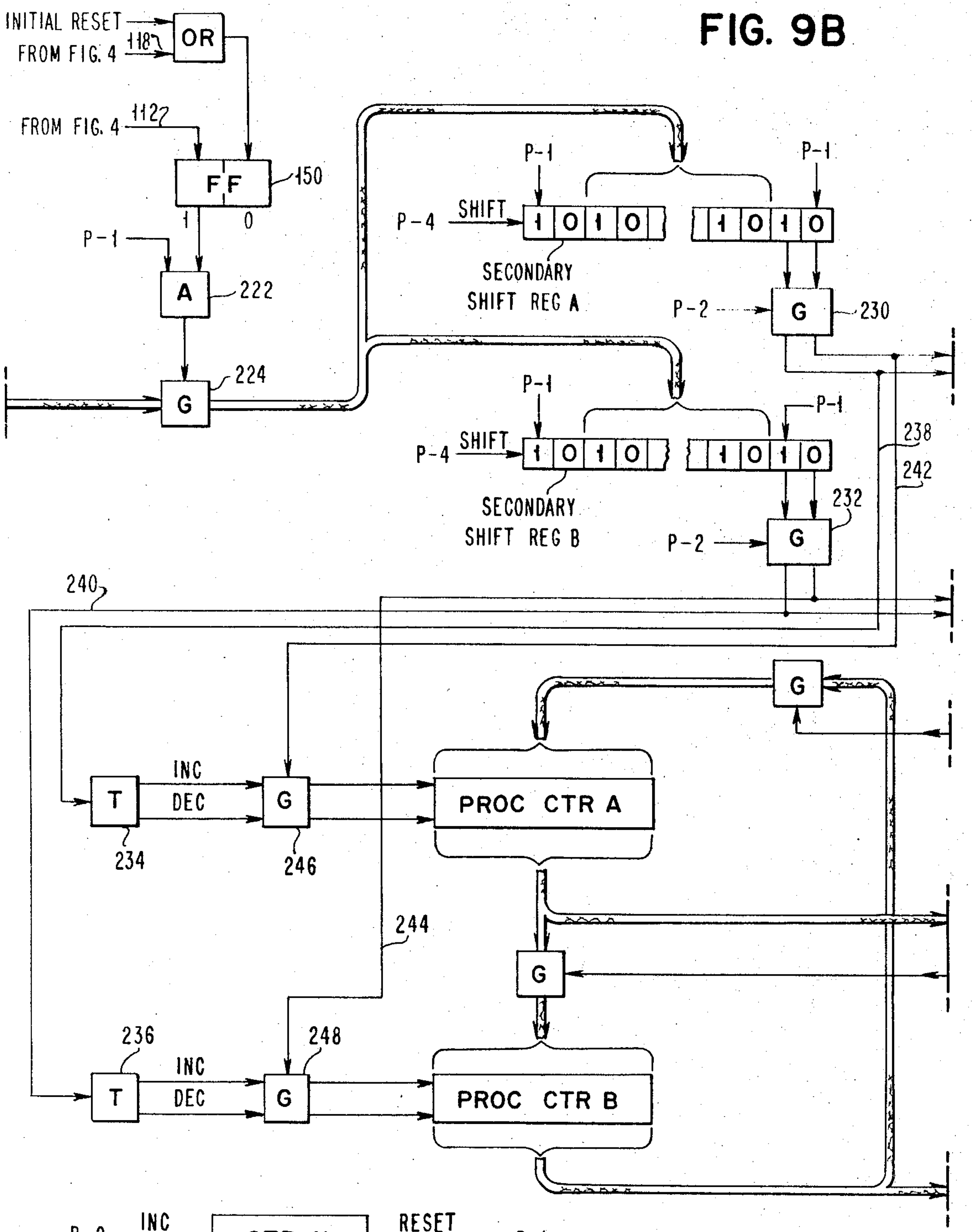
Figure 9G:
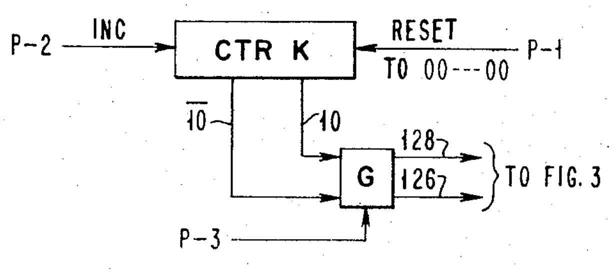
Figure 9C:
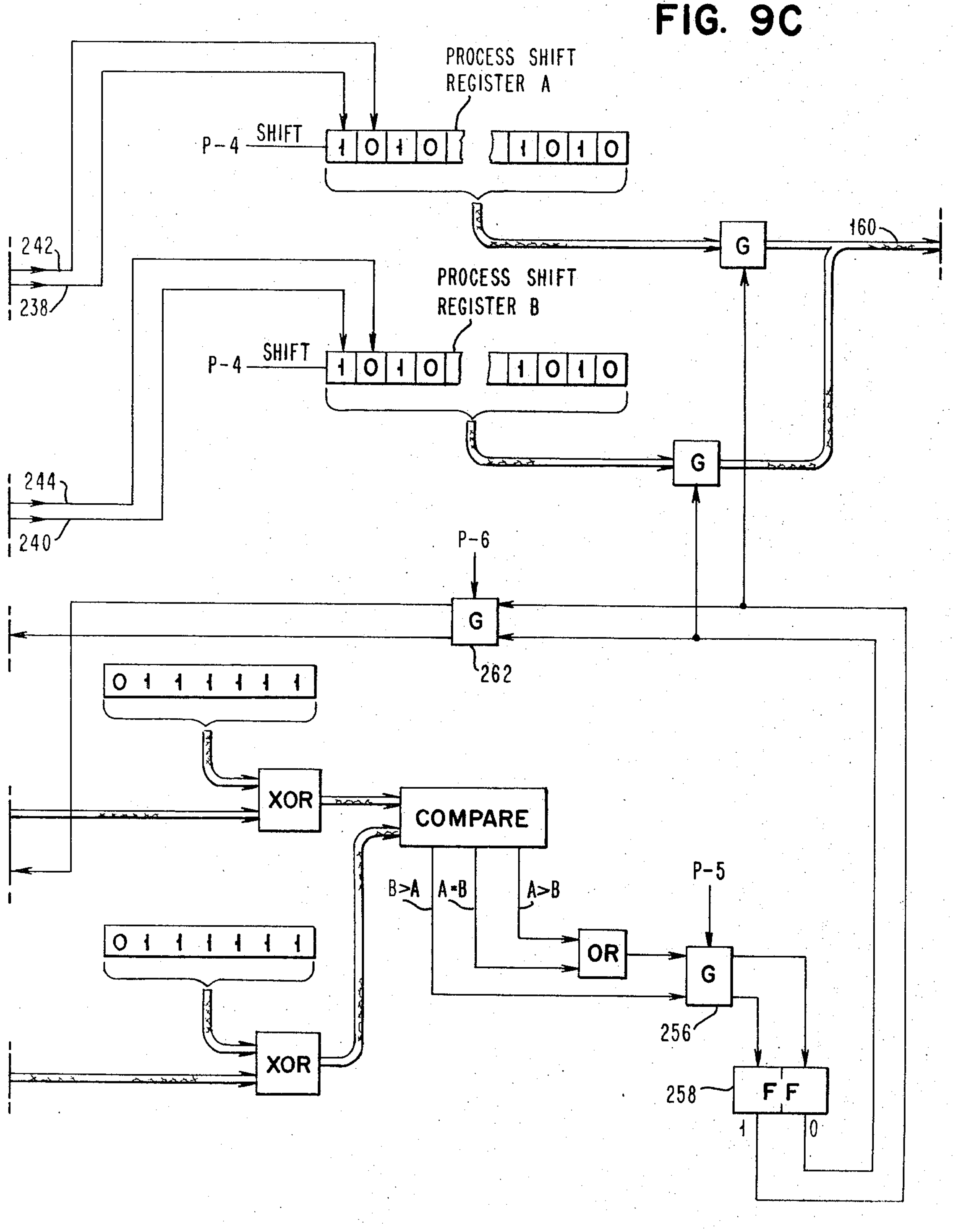
Figures 9D, 9H:
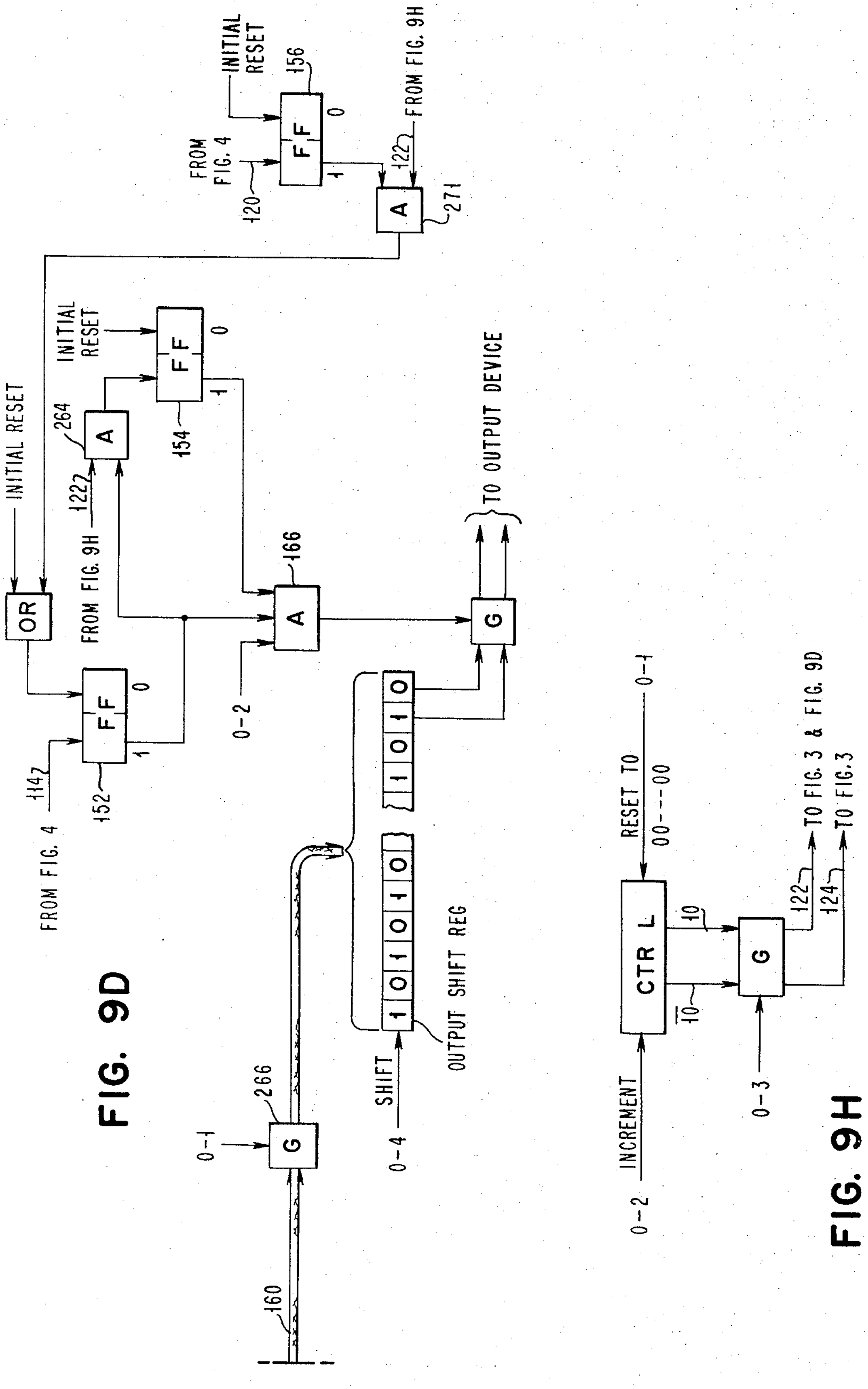

Before the processing of data $b_n$ is started, certain setting and resetting operations are performed. For example, all the single shots (SS), in FIGS. 3 and 4 must be in their "off" state. The flip-flops 134 through 144 inclusive in FIG. 1 are first set to the 1 state. The byte counter shown in FIG. 9A designated by the reference character 146 is set to the number of bytes which will be transmitted from the buffer to the recording device. With reference to FIG. 9, flip-flops 148, 150, 152 and 156 are all initially reset to the 0 state.

Referring to FIG. 9, it will be noted that when flip-flop 148 is in its 0 state the I-2 pulse will be ineffective to gate bits from the buffer to the primary shift register. Also, when flip-flop 150 is in its 0 state the P-1 pulse will be ineffective to gate the contents of the primary shift register to the secondary shift registers, and when either flip-flop 152 or 154 is in its 0 state the O-2 pulse will be ineffective to gate bits from the output shift register to the output device.

START PROCESSING

With reference to FIG. 3, operations are started by applying a start pulse through the OR circuit 130 to turn "ON" single shot 132. This produces the O-1 pulse which is utilized in FIG. 9 to gate in process shift register A or B, whichever is connected to cable 160, to the output shift register. It should be noted that this first cycle of the O clock is performed only in order to get the device started. However, in order to facilitate understanding of the device, its operation, will be traced throughout this first cycle. As stated before, nothing can be outputed from the output shift register because flip-flops 152 and 154 are in their 0 state. The O-1 pulse from single shot 132 also resets counter L to all zeros, and when single shot 132 goes "OFF" a pulse is transmitted through the OR circuit 162 to turn ON single shot 164. This produces the O-2 pulse which is used to increment the Counter L as shown in FIG. 9. As has previously been explained, the O-2 pulse is applied to AND circuit 166 but since this is the first cycle, it is ineffective.

When single shot 164 goes OFF a pulse is transmitted to turn ON single shot 168. This produces the O-3 pulse which is used to test counter L. If counter L is not presently set to 10, the O-3 pulse will appear on wire 124. If counter L is set at 10, then the pulse O-3 will appear on wire 122. Assuming that a pulse appears on wire 124, this pulse is used by the clock of FIG. 3 to turn ON single shot 170 in order to produce the O-4 pulse. The O-4 pulse is used to shift the output shift register. When single shot 170 turns OFF a pulse is transmitted through OR circuit 162 to again turn on single shot 164. This loop is repeated until counter L is advanced to 10. At this time, the O-3 pulse will cause a pulse to appear on wire 22 With reference to FIG. 3, it will be noted that the pulse on wire 122 is used to start all three clocks I, P and O. During the second cycle, the I clock, the P clock and the O clock will again be ineffective. However, the I clock when it completes its sequence during this second cycle will start the S clock.

Now, the sequence of the I clock will be described. With reference to FIG. 3, the pulse on wire 122 turns ON single shot 172 in order to produce the I-1 pulse. The I-1 pulse is used to reset counter J to all zeros. When single shot 172 goes OFF a pulse is transmitted through the OR circuit 174 to turn ON single shot 176 in order to produce the I-2 pulse. The I-2 pulse tries to gate in a bit from the buffer to the primary shift register but is ineffective because flip-flop 148 is in its 0 state at this time. The I-2 pulse is also used to increment counter J. When single shot 176 goes OFF it produces a pulse which turns ON single shot 178. This produces the I-3 pulse which is used to test counter J as shown in FIG. 9. If counter J is not at 8, the pulse will appear on wire 104 and if counter J is presently set at 8, a pulse will appear on wire 102. Assuming that a pulse does appear on wire 104, it is used to turn ON single shot 180 of FIG. 3. This produces the I-4 pulse which is used to shift the primary shift register. When single shot 180 goes OFF a pulse is produced which extends through OR circuit 174 to turn ON single shot 176. This loop is repeated until counter J reaches 8. At this time, the I-3 pulse appears on wire 102 of FIG. 9, which is used to turn ON single shot 182. This produces the I-5 pulse which is used to decrement the byte counter 146.

Figure 4:
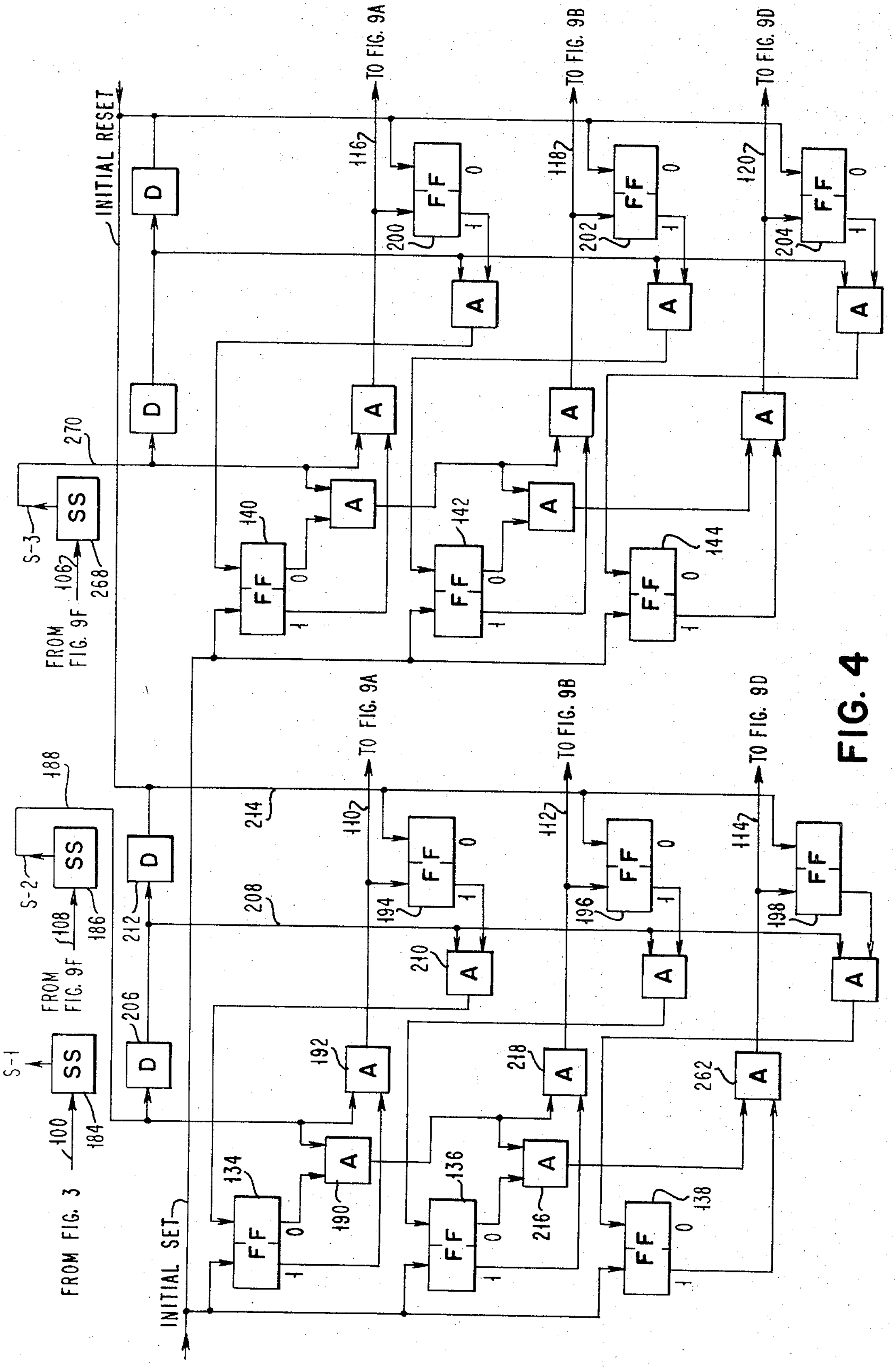
FIG. 4 illustrates the circuit configuration of the sequence clock control.

When single shot 182 goes OFF a pulse is produced on wire 100 which extends to and turns ON single shot 184. This produces the S-1 pulse which is used to test the byte counter 146. If the byte counter is not presently set to 0, then a pulse will appear on wire 108. If the byte counter is set to 0, then a pulse will appear on wire 106. Under the conditions described, the byte counter 146 will not be on 0 and therefore a pulse will appear on wire 108 which in FIG. 4 is used to turn ON single shot 186. A pulse will appear on wire 188 which extends to AND circuits 190 and 192. Because flip-flop 134 is in its 1 state, the pulse on wire 188 will pass through AND circuit 192 and appear on wire 110. Wire 110 extends to FIG. 9, when it is used to set flip-flop 148 to its 1 state. This has the result of making the I clock effective on the next cycle. Referring again to FIG. 4, the pulse on wire 110 sets flip-flop 194 to its 1 state. Note, that flip-flops 194 through 204 were initially reset to their 0 states. The pulse on wire 188 passes through the DELAY unit 206 and appears on wire 208 where it extends through AND circuit 210 and resets flip-flop 134 to its 0 state. Also, a succeeding pulse appears at the output of DELAY unit 212 which extends via wire 214 to reset flip-flop 194 to its 0 state. The P-1 pulse resets the right-hand bit of secondary shift register A to its 0 state and sets the right-hand bit of secondary shift reigster B to its 1 state. The P-1 pulse is also used to reset counter K to all zeros. With reference to FIG. 3, when single shot 220 turns OFF a pulse is produced which passes through OR circuit 226 to turn ON single shot 228. This produces the P-2 pulse which extends to FIG. 9 and is applied to GATES 230 and 232. This pulse permits the right-hand bit of secondary shift register A to be gated to the left-hand position of the process shift register A and also gate the rightmost bit of the secondary shift register B to the leftmost bit of the secondary shift register B to the leftmost bit position of the processor shift register B. If the bits shifted happen to be 1's, the pulses travel via wires 238 and 240 to TRIGGERS 234 and 236. A pulse on either wire 238 or 240 has the effect of shifting the state of the TRIGGER to which it is applied. If the bits shifted happen to be 0's pulses will appear on wires 242 and 244 which extends to GATES 246 and 248. Depending on the state of the TRIGGERS 234 and 236, the process counter A and the process counter B will be either incremented or decremented according to the state of the TRIGGERS. TRIGGER 246 and 248 will always be in opposite states.

The process counters A and B are seven-bit binary counters which can count from 0 to the binary equivalent of the decimal number 127. Initially, they are set at their midpoint which is the binary equivalent of the decimal number 63. Again referring to FIG. 9, the P-2 pulse is used to increment the counter K. When the P-2 pulse terminates, single shot 228 turns OFF and single shot 250 is turned ON.

The P-3 pulse is used to test counter K as shown in FIG. 9. If counter K is not presently set to 10, a pulse will appear on wire 128. Assuming that counter K is not on 10, the pulse on wire 126 is used to turn ON single shot 252. This produces the P-4 pulse which is used to shift both the secondary shift register A and the secondary shift register B shown in FIG. 9. When single shot 252 goes OFF a pulse is produced which extends through OR circuit 226 to again turn on single shot 228. This loop is repeated until counter K is on 10. At this time, the P-3 pulse which is applied to test counter K produces a pulse on wire 128 which extends to FIG. 3, and is used to turn ON single shot 254. This produces the P-5 pulse which is applied to gate 256 of FIG. 9 in order to set flip-flop 258 to either its 1 or its 0 state depending on the result of the comparison. If flip-flop 258 is set to its 0 state, the process shift register B will be gated to cable 160. If flip-flop 258 is set to its 1 state, the process shift register A will be gated to the cable 160.

Referring again to FIG. 3, when single shot 254 goes OFF single shot 260 will be turned ON. This produces the P-6 pulse which is applied to gate 262 of FIG. 9. Thus, it gates the contents of the process counter which has the smallest absolute value to the other process counter.

Referring to FIG. 4, at the end of the fourth cycle a pulse is again produced on wire 188 which now extends through AND circuit 190, through AND circuit 216 to the AND circuit 262. Because flip-flop 138 is in its 1 state, this will cause a pulse to appear on wire 114 which extends to FIG. 9 and sets flip-flop 152 to its 1 state. Flip-flop 138 is then reset to its 0 state by the circuit previously explained which uses the DELAY circuits 206 and 212. Flip-flop 198 also is reset to its 0 state by means previously described.

At the extreme end of the fourth cycle, a pulse will appear on wire 122. In FIG. 9, it will be noted that wire 122 extends to AND circuit 264. Because flip-flop 152 is now in its 1 state, AND circuit 264 will have an output which sets flip-flop 154 to its 1 state. The AND circuit 166 will now be enabled so that on the next, or fifth cycle, the O-2 pulse will be effective to output bits from the output shift register. The fifth cycle will next follow and it will be noted that the I clock, the P clock, and the O clock will all start in unison and be effective.

OUTPUT

The operation of the O clock will next be described. The O-1 pulse is applied to gate 266 in order to gate either process shift register A or process shift register B to the output shift register. It also resets counter L to all 0's.

The O-2 pulse is applied to the AND circuit 166 in order to gate out the rightmost bit of the output shift register to the output device which is the transformer coupling to the write head to magnetic recording device. The O-2 pulse also increments counter L.

The O-3 pulse is utilized to test counter L. If counter L is not presently at 10, the O-3 pulse will appear on wire 124. Wire 124 extends to FIG. 3 where it produces the O-4 pulse which is used to shift the output shift register of FIG. 9. The O clock then returns to O-2. This loop continues until counter L is at 10. At this time, when it is tested by the O-3 pulse, the pulse appears on wire 122 which as explained before starts the I clock, the P clock, and the O clock.

The system now continues to output bits until the byte counter 146 goes to 0. If the cycle on which the byte counter goes to 0 is referred to as cycle N then two more cycles are needed to process and output the last byte. These two cycles can be referred to as cycle N+1 and cycle N+2. Referring to FIG. 4, on cycle N, the single shot 268 will be turned ON. This happens because the S-1 pulse tests the byte counter 146 and if it is on 0, a pulse will appear on wire 106 which extends to FIG. 4 in order to turn ON single shot 268. It should be noted that in FIG. 4, the flip-flops 140, 142, and 144 are associated with a circuit which is similar to the circuit on the left side of FIG. 4, which uses flip-flops 134, 136, and 138. At the end of cycle N, the pulse on wire 270 will appear on wire 116 which extends to FIG. 9 and resets flip-flop 148 to its 0 state. This means that on cycle N+1 the I-2 pulse will be ineffective to gate in bits from the buffer. Flip-flop 140 is reset to its 0 state by means previously described.

The N+1 cycle will now follow during which the last byte will be processed by the mechanism shown in FIG. 9. At the end of cycle N+1, the pulse again appears on wire 270 which now extends to wire 118. Wire 118 is used to reset flip-flop 150 to its 0 state. This means that during cycle N+2, the P-1 pulse will be ineffective to gate in the primary shift register to either of the secondary shift registers of FIG. 9.

Cycle N+2 will next follow during which the last byte will be output by the mechanism shown on FIG. 9. Near the end of cycle of N+1, a pulse again appears on wire 270 which now will appear on wire 120. Wire 120 sets flip-flop 156 to its 1 state. This will permit the pulse on wire 122 which occurs at the extreme end of cycle N+2 to extend through AND circuit 271 and reset flip-flop 152 to its 0 state. It will be noted that now AND circuit 166 will be ineffective to permit the O-2 pulse to outgate any more bits from the output shift register. Operations are now complete and the machine can be turned off in any suitable manner.

The above description is a preferred embodiment of the invention and many modifications may be made thereto without departing from the spirit and scope of the invention. Furthermore, it should be recognized that while the preferred embodiment has been described in terms of a hardware structure, it is possible to implement the inventive concepts disclosed herein by means of a programmed general purpose computer. Each of the circuit funtions executed in the preferred embodiment may be carried out by analogous software counterpart.

What is claimed is:

1. A method for limiting a.c. coupling distortion in a transformer coupled saturation magnetic recording system for recording a stream of binary bits, said method comprising the steps of:
- segmenting said stream of bits that are to be recorded on a magnetic medium into specified length blocks of data within storage means;
- computing the digital sum of each of said blocks of data as obtained from said storage means;
- inserting a prefix zero or one binary value prior to each of said blocks of data that is to be transmitted to a magnetic recording head depending on the computed digital sum;
- transmitting one combined prefix and block to said magnetic recording head.

2. The process as defined in claim 1 further comprising the step of combining the digital sum computed for each block of data with the sum computed from all previous blocks processed.

3. The process as defined in claim 2 wherein said step of computing a digital sum further comprises:
- determining whether the prefix bit is represented by a binary zero or one value;
- if said prefix is a one binary value, then adding a value of one to the digital sum for every succeeding zero bit after said prefix until another one value is detected;
- subtracting a quantity of one from said sum for all succeeding zero binary bits detected after said prefix until a binary one is detected;
- reversing the addition and subtraction steps when a one bit is detected in said data block.

4. A device for limiting a.c. coupling distortion of a transformer coupled saturation magnetic recording system that records binary information in accordance with non-return-to-zero recording system in which the recording head receives binary information by means of transformer coupling, said device comprising:
- means for receiving a stream of binary digits;
- means for segmenting said stream of binary digits into blocks of specified length;
- prefix means connected to said means for segmenting for placing a zero or one binary value as a prefix to each of said blocks of data that is transmitted to said recording head;
- processor means for computing a running digital sum of said blocks of data with their respective prefix binary bit values and selecting either a zero or one prefix in accordance with said running digital sum;
- output means for providing a prefix coded binary block data output for each of said segmented data blocks.

5. The device as described in claim 4 wherein said prefix means comprises;
- first store means containing a zero prefix bit;
- second store means containing a one prefix bit;
- transfer means for loading the blocks of data following said prefix bits in said first and second store means;
- switch means connected to said first and second store means for selecting for transmission to said recording head, blocks of data having either a zero or one prefix bit.

6. The device as claimed in claim 5 wherein said processor means comprises:
- first and second processor means, each of said processors respectively processing the contents of said first and second store means;
- comparator means for comparing the running digital sum compiled by said first and second processors and providing an output control signal to said switch means for controlling the selection of a zero or one prefix in combination with each of said data blocks.

7. A device for limiting a.c. coupling distortion of a transformer coupled saturation magnetic recording system that records binary information in accordance with non-return-to-zero recording system in which the recording head receives binary information by means of transformer coupling, said device comprising:
- means for receiving a stream of binary digits;
- means for segmenting said stream of binary digits into blocks of specified length;
- switch bit means for placing a switch binary digit at a bit location within said blocks;
- processor means for computing a running digital sum of said blocks of data;
- switch bit selection means for selecting the binary ditit value which is used by said switch bit means;
- output means for providing a coded binary block data output for each of said segmented data blocks.

* * * * *